United States Patent [19]

Masuda et al.

[11] Patent Number: 5,079,062
[45] Date of Patent: Jan. 7, 1992

[54] MAGNETIC RECORDING MEDIUM HAVING A THIN FILM MAGNETIC LAYER FORMED OVER A NON-MAGNETIC SUBSTRATE WHICH HAS POWDER GRAINS OF THE SUBSTRATE DISPOSED ON ITS SURFACE

[75] Inventors: Kenzo Masuda; Masaaki Imamura, both of Odawara; Fumio Nakano, Hitachi, all of Japan

[73] Assignee: Hitachi, Ltd., Tokyo, Japan

[21] Appl. No.: 374,366

[22] Filed: Jun. 30, 1989

[30] Foreign Application Priority Data

Jul. 4, 1988 [JP] Japan .................................. 63-164999

[51] Int. Cl.$^5$ ................................................ G11B 5/00
[52] U.S. Cl. ............................................ 428/64; 428/65; 428/337; 428/402; 428/695; 428/694; 428/900; 427/129; 427/130; 427/131
[58] Field of Search ................ 428/900, 694, 141, 144, 428/148, 64, 65, 402, 337, 695

[56] References Cited

U.S. PATENT DOCUMENTS

| | | | |
|---|---|---|---|
| 4,514,451 | 4/1985 | Suzuki et al. | 428/141 |
| 4,540,618 | 9/1985 | Suzuki et al. | 428/141 |
| 4,698,251 | 10/1987 | Fukuda et al. | 428/64 |
| 4,778,707 | 10/1988 | Arioka et al. | 428/141 |
| 4,880,687 | 11/1989 | Yokoyama et al. | 428/141 |

FOREIGN PATENT DOCUMENTS

| | | |
|---|---|---|
| 57-20925 | 2/1982 | Japan . |
| 60-40418 | 3/1985 | Japan . |
| 60-136920 | 7/1985 | Japan . |

*Primary Examiner*—Merrell C. Cashion, Jr.
*Assistant Examiner*—Stevan A. Resan
*Attorney, Agent, or Firm*—Kenyon & Kenyon

[57] ABSTRACT

In a magnetic recording medium in which a thin film of a magnetic material is disposed on a surface of a base of a non-magnetic material directly or through an undercoated film, powder of a material substantially the same as that of the non-magnetic base or an undercoated film is disposed directly beneath the magnetic thin film to form dispersed projections on the surface of the magnetic recording medium. Thus, the product has surface projections, and its magnetic thin film has a generally uniform thickness and uniform magnetic properties.

23 Claims, 1 Drawing Sheet

MAGNETIC RECORDING MEDIUM HAVING A THIN FILM MAGNETIC LAYER FORMED OVER A NON-MAGNETIC SUBSTRATE WHICH HAS POWDER GRAINS OF THE SUBSTRATE DISPOSED ON ITS SURFACE

BACKGROUND OF THE INVENTION

The present invention relates to a magnetic recording medium used for recording information on its magnetic film and a method of manufacturing such a recording medium. More particularly, the present invention relates to a magnetic recording medium having a continuous magnetic film on its surface and a method of manufacturing such a recording medium.

A conventional magnetic recording medium, such as a conventional magnetic disk used in an information recording and reproducing apparatus, is made by binding powder of an oxide magnetic material by an organic binder and coating a film of the oxide magnetic material on a surface of a base. Such a conventional magnetic recording medium will be referred to hereinafter as a coated type recording medium. With the ever-increasing demand for improvements in the recording density of such a coated type recording medium, a magnetic recording medium having a continuous thin film of a magnetic material on a surface of its base has been proposed to replace the coated type recording medium. The proposed recording medium will be referred to hereinafter as a thin-film type recording medium. The recording surface of the thin-film type recording medium is generally very flat and smooth, and, in order to prevent damage due to repeated relative sliding contact between a magnetic head and the recording surface, a lubricating agent is coated on the recording surface of the thin-film type recording medium. However, when the magnetic head stops its movement relative to the recording surface of the magnetic disk, a strong adhesion occurs between the head and the disk due to the presence of the lubricating agent on the recording surface. Therefore, when the relative movement is then to be started, a very large force is required to release the magnetic head from adhesion to the surface of the magnetic disk, with the result that the spring system supporting the magnetic head may be damaged, thereby giving rise to great operational troubles. Even in the absence of the lubricating agent, a phenomenon similar to the adhesion phenomenon described above may be caused by the presence of, for example, adsorbed moisture. Therefore, the undesirable adhesion should be avoided or prevented.

JP-A-57-20925 describes an invention in which, in order to prevent the undesirable adhesion described above, powder of a non-magnetic material is dispersed on the surface of a magnetic film provided on a base of a magnetic disk so as to form dispersed projections on the recording surface of the magnetic disk.

Also, JP-A-60-40528 and JP-A-60-136920 describe inventions in which fine powder of a hard non-magnetic magerial such as alumina is previously partly embedded under pressure in a surface of a base of a magnetic disk so as to form dispersed projections on the recording surface of a magnetic film of the magnetic disk. In each of these inventions, no adhesion between a magnetic head and the magnetic disk occurs, because the magnetic head brought into sliding contact with the magnetic film does not make direct intimate contact with the magnetic film due to the presence of the projections.

However, the stability of the projections is not taken into consideration in the disclosure of JP-A-57-20925 cited above. More precisely, how to attach the non-magnetic powder to the surface of the magnetic film is not specifically described in JP-A-57-20925 cited above, and the results of an experiment conducted by the inventors to attach powder of alumina to the surface of the magnetic film by such a means as a binder have proved that the powder of alumina tends to be easily detached from the surface.

The stability of the projections is not also taken into consideration in the disclosure of each of JP-A-60-40528 and JP-A-60-136920 cited above, and there has been such a problem that, during cleaning the base, the projections are partly detached thereby leaving pit-like defects.

SUMMARY OF THE INVENTION

The present invention provides a thin-film type magnetic recording medium in which powder providing dispersed surface projections is hard to detach and a method of manufacturing such a recording medium.

The present invention also provides a magnetic recording medium which has dispersed projections on its surface and includes a thin film of a magnetic material having a generally uniform thickness as well as uniform magnetic properties and a method of manufacturing such a recording medium.

The present invention further provides a magnetic recording medium which minimizes damage to a magnetic head and which can ensure the capability of repeated sliding contact of the magnetic head with the recording medium for a long period of time and a method of manufacturing such a recording medium.

The present invention also provides a magnetic recording medium in which the powder is firmly retained in position without the possibility of detachment and a method of manufacturing such a recording medium.

The present invention which provides the above characteristics provides a magnetic recording medium comprising a thin film of a magnetic material disposed on a surface of a base of a non-magnetic material directly or through an undercoated film of a hard non-magnetic material, wherein powder of a material substantially the same as that of the non-magnetic base or undercoated film is disposed directly beneath the magnetic thin film to form dispersed projections on the surface of the magnetic recording medium.

The present invention also provides also a method of manufacturing a magnetic recording medium comprising treating the surface of a non-magnetic base or undercoated film by the steps of grinding a surface of a base composed of a non-magnetic material or an undercoated film composed of a hard non magnetic material formed on the surface of the non-magnetic base and supplying an organic solvent as a grinding liquid, washing the non-magnetic base or undercoated film after the ground surface treatment to leave part of powder of the material in a desired amount on the surface of the non-magnetic base or undercoated film, and forming a thin film of a magnetic material on the non-magnetic base or undercoated film.

The non-magnetic base preferably used in the present invention is formed of a material such as a non-magnetic metal, glass or ceramics and has a thickness of about 1 to 3 mm.

The non-magnetic hard undercoated film may or may not be provided. When a base formed of an aluminum alloy is used, the undercoated film is commonly formed of a non-magnetic alloy including nickel as its essential component, for example, a Ni-P alloy. The hard undercoated film may be composed of a plurality of layers.

It is an important requirement that the material of the powder is substantially the same as that of the underlying base or undercoated film. That is, when the undercoated film is not provided and the powder is directly disposed on the base, the material of the powder should be substantially the same as that of the base, while when the undercoated film is provided, the material of the powder should be substantially the same as that of the undercoated film. Thus, when the material of the powder is selected to be substantially the same as that of the underlying base or undercoated film, the thickness of the portions of the magnetic thin film formed on the corresponding portions of the base or undercoated film where the powder is present does not appreciably differ from that of the remaining portions of the magnetic thin film, so that the thickness of the entire magnetic thin film formed on the base or undercoated film can be made substantially uniform.

Preferably, the grains of the powder have a mean diameter of about 0.10 to 1.0 $\mu$m. By the use of such powder, dispersed projections having a height of about 0.10 to 1.0 $\mu$m are formed on the recording surface of the magnetic recording medium. When the height of the projections is larger than 1.0 $\mu$m, a magnetic head moving in a floating state relative to the magnetic recording medium will collide against the projections, and the magnetic head as well as the magnetic recording medium will be damaged. On the other hand, when the height of the projections is smaller than 0.10 $\mu$m, the desired effect of preventing adhesion between the magnetic head and the magnetic recording medium cannot be fully exhibited. The powder is preferably disposed on the surface of the base or undercoated film in an amount which provides a density of 0.1-20 grains/mm$^2$ of the surface area of the base or undercoated film. This amount can be measured by observing the surface of the product of the magnetic recording medium by, for example, an optical microscope of about 200 magnifications.

A material such as a cobalt alloy commonly employed in this field can be used to provide the magnetic thin film. A protective film is preferably provided on the magnetic thin film. A protective material such as carbon, a nitride or an oxide commonly employed in this field can be used to form the protective film.

At least one of the base and the hard undercoated film used in the present invention is preferably formed with grooves. These grooves are commonly concentric in pattern. However, they may be spiral in pattern or may be a pattern of part concentric or and spiral grooves.

In the magnetic recording medium (magnetic disk) of the present invention, a large binding force acts between the base or the hard undercoated film and the powder disposed thereon, because the material of the powder is substantially the same as that of the base or the undercoated film. Further, because the magnetic thin film, or more preferably, the protective film extends in the form of a continuous layer to cover all the grains of the powder, the powder can be retained in position without the possibility of detachment. Furthermore, in the magnetic disk of the present invention, undesirable adhesion of a magnetic head to the recording surface hardly occurs so that the capability of repeated sliding contact of the magnetic head with the recording surface of the magnetic disk is ensured for a long period of time.

DETAILED DESCRIPTION

The present invention, having grooves, will now be described by way of example.

Figure 1:
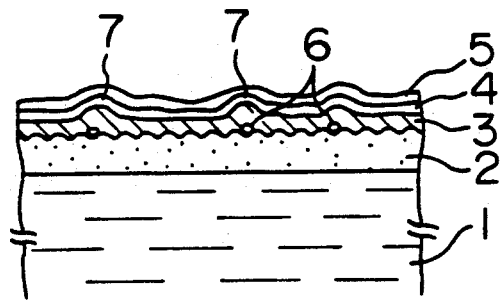
FIG. 1 is a schematic sectional view of part of an embodiment of the magnetic recording medium (magnetic disk) according to the present invention.

FIG. 1 is a schematic sectional view of part of an embodiment of the magnetic recording medium (magnetic disk) according to the present invention.

Referring to FIG. 1, the magnetic disk includes a base 1 of a non-magnetic material such as an aluminum alloy, and an undercoated film 2 of a hard non-magnetic material such as a Ni-P alloy is formed on a surface of the base 1 by means such as plating. Grinding is applied to the surface of the hard undercoated film 2 to make this surface flat and smooth and to form grooves in this surface. Generally, both the ground surface of the undercoated film 2 immediately after the grinding and the surface or powder of the material removed from the undercoated film 2 by grinding and remaining after the grinding, are active, and a strong binding force acts therebetween. Therefore, in order to make the desired surface, it is necessary to prevent reattachment of the powder of the removed material to the ground surface of the undercoated film 2, and, for this purpose, a grinding liquid is supplied in the step of grinding. By suitably selecting this grinding liquid and then washing the surface of the undercoated film 2 after the step of grinding, part of the powder of the removed material can be left attached and fixed to the surface of the undercoated film 2. That is, when a slurry containing an organic solvent such as light oil or trichloro-trifluoroethane as its basic component is used as the grinding liquid, and a neutral synthetic detergent is used to purify the treated surface and to remove easily detachable grains of the powder of the removed material, hard to detach grains of the powder of the removed material are left on the surface of the undercoated film 2.

A thin film 3 of a magnetic material such as a cobalt alloy is then formed on the undercoated film 2 by means such as sputtering, and a protective film 4 of a material such as carbon is then formed on the magnetic thin film 3 by means such as sputtering. A lubricating film 5 of a material such as a fluorine-containing lubricant is then formed on the protective film 4 by a spraying method, a dipping method or the like.

On the other hand, when a slurry containing water as its basic component is used as the grinding liquid, a large amount of hard to detach grains are produced in the powder of the removed material this results in many undesirable grains remaining on the surface of the undercoated film 2 regardless of application of whatever washing method is selected. Thus, when such a magnetic recording medium is combined with a magnetic head, and the contact start/stop operation is effected, an undesirable head crush will occur in a short period of time.

Figure 2:
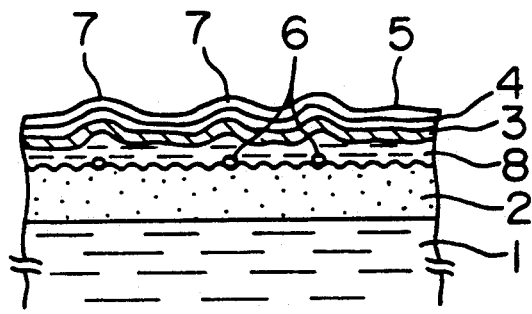
FIG. 2 is a schematic sectional view of part of another embodiment of the magnetic recording medium (magnetic disk) according to the present invention.

FIG. 2 is a schematic sectional view of another embodiment of the magnetic recording medium (magnetic disk) according to the present invention. The magnetic disk shown in FIG. 2 is a partial modification of that shown in FIG. 1, and a second undercoated film 8 is formed between the magnetic thin film 3 and the hard undercoated film 2. The material of this second undercoated film 8 is, for example, chromium having a peculiar crystal growth characteristic. This second undercoated film 8 is formed by means such as sputtering and contributes to the control of the magnetic properties of and increase the strength of the magnetic thin film 3.

Three examples of the magnetic disk according to the present invention were made and compared with two comparative examples as shown in Table 1. Each of these magnetic disks was manufactured by preparing the base 1 of Al, plating the surface of the base 1 with a Ni-P alloy to form the hard undercoated film 2, treating the surface of the undercoated film 2 with a grinding liquid containing dispersed abrasive grains of diamond, washing to remove the grinding liquid and residue of surface treatment, successively laminating the second undercoated film 8 of Cr, the magnetic thin film 3 of a Co-Ni alloy and the protective film 4 of C in the above order by a DC sputtering apparatus, and then depositing the fluorine-containing lubricating film 5 by a dipping method. In the manufacture of these magnetic disks, various combinations of the grinding liquid and the washing method were employed as shown in Table 1, except that the comparative example 2 was not subjected to the surface treatment and washing. Further, the thickness of the lubricating film 5 in each of these magnetic disks was changed.

The surface of each of the magnetic disks was observed by an optical microscope of 200 magnifications to measure the number of dispersed projections. Also, a magnetic head of MnZn ferrite formed into the shape of a slider was pressed onto the surface of the magnetic disk to impart a load of 10 grams, and, after a period of 100 hours, the tangential force was measured at a temperature of 24° C. and a relative humidity of 98%. This experiment was repeated on each of the individual magnetic disks having different thicknesses of the lubricating film 5 to find the maximum value of the film thickness where the measured tangential force was smaller than 10 gf. It is apparent that, the larger the thickness of the lubricating film 5 where the tangential force becomes smaller than the value of 10 gf, there is less tendency of occurrence of undesirable adhesion between the magnetic head and the magnetic disk even when the amount of the lubricating material is large. The results of the experiment described above are summarized in Table 1. Although the results of the experiment conducted on the magnetic disk structure having the second undercoated film 8 shown in FIG. 2 are shown in Table 1 by way of example, it is apparent that similar results are also obtained in the case of the magnetic disk structure not having the second undercoated film 8 as shown in FIG. 1.

TABLE 1

|  | Grinding liquid | Washing method | Projection density (grains/mm$^2$) | Maximum film thickness (nm) |
|---|---|---|---|---|
| Example 1 | Light-oil base slurry | Washing with alkaline degreasing agent | 0.11 | 6.0 |
| Example 2 | Light-oil base slurry | Washing with neutral synthetic detergent | 0.02 | 5.0 |
| Example 3 | Organic-solvent base slurry | Washing with neutral synthetic detergent | 6.4 | 6.0 |
| Comparative example 1 | Water base slurry | Washing with neutral synthetic detergent | 50 | 6.0 |
| Comparative example 2 |  | None | 0 | 2.0 |

The maximum thickness of the lubricating film 5 where the tangential force becomes smaller than 10 gf is large in the comparative example 1. However, because of the large projection density, an undesirable head crush occurs when the magnetic disk is actually combined with a magnetic head, and the contact start/stop operation is effected.

It will be understood from the foregoing description that the magnetic recording medium of the present invention has a less tendency of adhesion with a magnetic head, so that the magnetic recording medium does not damage the spring system supporting the magnetic head and is hardly damaged by repeated sliding contact with the magnetic head. Therefore, when the magnetic recording medium of the present invention is combined with the magnetic head, a magnetic disk apparatus is realized which ensures the capability of repeated sliding contact of the magnetic head with the magnetic recording medium for a long period of time.

What is claimed is:

1. A magnetic recording medium comprising:
   a base of non-magnetic material,
   powder disposed on a surface of said non-magnetic base, the material of said powder being substantially the same as that of said non-magnetic base, said powder being fixed by cohesive force between said powder and said non-magnetic base caused by substantially the same materials of both said powder and said non-magnetic base, wherein grains of said powder are distributed with a density of 0.1 to 20 grams/mm$^2$ and have a mean diameter of 0.1 to 1.0 μm;
   a thin film of a magnetic material formed to cover said non-magnetic base and said powder, the surface of said magnetic thin film having dispersed projections attributable to said powder disposed on said non-magnetic base; and
   a protective film formed on said magnetic thin film, the surface of said protective film having dispersed projections corresponding to the surface projections of said magnetic thin film.

2. A magnetic recording medium according to claim 1, wherein said non-magnetic base is formed with concentric or spiral grooves.

3. A magnetic recording medium according to claim 1, wherein said powder consists of grains of the material removed by grinding said non-magnetic base.

4. A magnetic recording medium according to claim 2, wherein said powder consists of grains of the material removed by grinding said non-magnetic base.

5. A magnetic recording medium according to claim 1, wherein a lubricating film is further formed on said protective film.

6. A magnetic recording medium according to claim 2, wherein a lubricating film is further formed on said protective film.

7. A magnetic recording medium according to claim 3, wherein a lubricating film is further formed on said protective film.

8. A magnetic recording medium according to claim 4, wherein a lubricating film is further formed on said protective film.

9. A magnetic recording medium according to claim 1, wherein said non-magnetic base has a thickness of 0.5 to 4 mm.

10. A magnetic recording medium comprising:
   a base of a non-magnetic material;
   an undercoated film of a hard non-magnetic material formed on a surface of said non-magnetic base;
   powder disposed on said undercoated film, the material of said powder being substantially the same as that of said undercoated film, wherein grains of said powder are distributed with a density of 0.1 to 20 grains/mm$^2$ and have a mean diameter of 0.1 to 1.0 μm;
   a thin film of a magnetic material formed to cover said undercoated film and said powder, the surface of said magnetic thin film having dispersed projections attributable to said powder disposed on said undercoated film; and
   a protective film formed on said magnetic thin film, the surface of said protective film having dispersed projections corresponding to the surface projections of said magnetic thin film.

11. A magnetic recording medium according to claim 10, wherein said undercoated film is formed with concentric or spiral grooves.

12. A magnetic recording medium according to claim 10, wherein said powder consists of part of grains of the material removed by grinding said undercoated film.

13. A magnetic recording medium according to claim 11, wherein said powder consists of part of grains of the material removed by grinding said undercoated film.

14. A magnetic recording medium according to claim 10, wherein said non-magnetic base is formed of Al or its alloy, said undercoated film has a double layer structure consisting of a layer of a Ni-P alloy and a layer of Cr, and said powder is disposed on said Ni-P alloy layer and formed of the Ni-P alloy.

15. A magnetic recording medium according to claim 11, wherein said non-magnetic base is formed of Al or its alloy, said undercoated film has a double layer structure consisting of a layer of a Ni-P alloy and a layer of Cr, and said powder is disposed on said Ni-P alloy layer and formed of the Ni-P alloy.

16. A magnetic recording medium according to claim 10, wherein a lubricating film is further formed on said protective film.

17. A magnetic recording medium according to claim 11, wherein a lubricating film is further formed on said protective film.

18. A magnetic recording medium according to claim 13, wherein a lubricating film is further formed said protective film.

19. A magnetic recording medium according to claim 13, wherein a lubricating film is further formed on said protective film.

20. A magnetic recording medium according to claim 14, wherein a lubricating film is further formed on said protective film.

21. A magnetic recording medium according to claim 15, wherein a lubricating film is further formed on said protective film.

22. A magnetic recording medium according to claim 10, wherein said powder is fixed by cohesive force generated between said powder and said undercoated film without a binder layer of fixing said powder.

23. A magnetic recording medium according to claim 10, wherein said non-magnetic base has a thickness of 0.5 to 4 mm.

* * * * *

UNITED STATES PATENT AND TRADEMARK OFFICE
CERTIFICATE OF CORRECTION

PATENT NO. : 5,079,062

DATED : January 7, 1992

INVENTOR(S) : Kenzo Masuda, et al.

It is certified that error appears in the above-identified patent and that said Letters Patent is hereby corrected as shown below:

| Column | Line | |
|---|---|---|
| 1 | 62 | Change "magerial" to --material--. |
| 2 | 51 | After "provides" delete "also". |
| 3 | 56 | After "concentric" delete "or"; before "spiral" insert --part--. |
| 4 | 29 | After "surface" change "or" to --of--. |
| 4 | 47 | Before "hard" insert --only--. |
| 5 | 26 | Change "increase" to --increases--. |
| 8 | 26 | Change "13" to --12--; after "formed" insert --on--. |
| 8 | 40 | Delete "of". |

Signed and Sealed this

Sixth Day of July, 1993

Attest:

MICHAEL K. KIRK

Attesting Officer

Acting Commissioner of Patents and Trademarks